United States Patent
Choisnet et al.

(10) Patent No.: US 8,261,609 B2
(45) Date of Patent: Sep. 11, 2012

(54) AERODYNAMIC MEASUREMENT PROBE AND HELICOPTER EQUIPPED WITH THE PROBE

(75) Inventors: Joel Choisnet, Naveil (FR); Jacques Mandle, Naveil (FR)

(73) Assignee: Thales, Neuilly-sur-Seine (FR)

( * ) Notice: Subject to any disclaimer, the term of this patent is extended or adjusted under 35 U.S.C. 154(b) by 400 days.

(21) Appl. No.: 12/643,272

(22) Filed: Dec. 21, 2009

(65) Prior Publication Data

US 2010/0154528 A1 Jun. 24, 2010

(30) Foreign Application Priority Data

Dec. 23, 2008 (FR) ...................................... 08 07394

(51) Int. Cl.
*G01P 13/00* (2006.01)
*G01P 5/00* (2006.01)

(52) U.S. Cl. ................. 73/170.02; 73/170.07; 73/170.13

(58) Field of Classification Search ... 73/170.02–170.13
See application file for complete search history.

(56) References Cited

U.S. PATENT DOCUMENTS

| 4,143,548 | A | | 3/1979 | Graewe et al. |
| 4,649,387 | A | * | 3/1987 | Maris ........................... 340/966 |
| 4,890,488 | A | | 1/1990 | Pincent et al. |
| 5,783,745 | A | | 7/1998 | Bergman |
| 6,817,240 | B2 | * | 11/2004 | Collot et al. ............... 73/170.02 |
| 7,051,586 | B2 | * | 5/2006 | Choisnet et al. ............... 73/147 |
| 2005/0232332 | A1 | * | 10/2005 | Hanson et al. ................ 374/141 |
| 2011/0285550 | A1 | * | 11/2011 | Maris ............................ 340/966 |

FOREIGN PATENT DOCUMENTS

FR 2628216 A1 9/1989

* cited by examiner

*Primary Examiner* — Andre Allen

(74) *Attorney, Agent, or Firm* — Baker & Hostetler LLP

(57) ABSTRACT

The invention relates to a probe for aerodynamic measurement of an airflow. The probe comprises a plate rotating about an axis, a transmitter for transmitting a sound wave and a receiver responsive to the sound wave, the transmitter and the receiver forming two elements which are integrally connected to the plate and are placed at separate positions on the plate, the probe furthermore comprising means for delivering information representing a time of flight of the sound wave between the two elements and a temporal variation of the information. In the case of using the probe on board a helicopter, the rotating plate is advantageously placed at the centre of the rotor of the helicopter while being integrally connected to it. This type of probe makes it possible to carry out aerodynamic measurements even at low airspeeds of the helicopter.

9 Claims, 3 Drawing Sheets

AERODYNAMIC MEASUREMENT PROBE AND HELICOPTER EQUIPPED WITH THE PROBE

CROSS-REFERENCE TO RELATED APPLICATIONS

This application claims priority of foreign French patent application no. FR 0807394, filed Dec. 23, 2008, the disclosure of which is hereby incorporated by reference in its entirety.

TECHNICAL FIELD

The invention relates to a probe for aerodynamic measurement of an airflow and to a helicopter equipped with the probe. Notably, the invention makes it possible to determine the velocity of the incidence of an airflow locally in the vicinity of the probe. The invention has particular utility in the field of aeronautics, in which knowledge of the velocity and the incidence of an airflow around an aircraft is essential for piloting the aircraft.

BACKGROUND OF THE INVENTION

It is known to determine the airspeed V of an aircraft on the basis of pressure measurements of the air around the aircraft. More precisely, by measuring the total pressure Pt for example with the aid of a Pitot tube, and the static pressure Ps of the air, the airspeed V of the aircraft can be determined by the following equation $$Pt - Ps = \rho \frac{V^2}{2}$$

where $\rho$ represents the density of the air.

At low airspeed, this measurement method gives unreliable results. This is because the square of the airspeed is proportional to the pressure difference Pt−Ps. A small error in the pressure measurements consequently leads to a large error in the airspeed. More precisely, differentiating the equation cited above gives:

$$d(Pt - Ps) = \rho \cdot V \cdot dV$$

or $$dv = \frac{d(Pt - Ps)}{\rho \cdot V}$$

This shows that a finite error d(Pt−Ps) in the pressure measurements leads to an infinite error dV in the airspeed determination when the velocity is zero, or a large error in the airspeed determination when the airspeed is low. For example, at 10 knots of true airspeed, an error of 1 hPa in the pressure measurements leads to an error of 30 knots in the airspeed determination. When the error is larger than the measurement, the result is unacceptable.

Optical measurement devices, or lidars, can also make it possible to determine the velocity and the direction of the airflow by detecting the Doppler effect in a back-scattered signal of a light beam emitted by the measurement device into a medium which is intended to be analyzed. The Doppler effect consists in a frequency shift of a light wave reflected by a moving object. The distance between the measurement device and the object, for example a group of moving particles, defines the type of detection of the Doppler shift, which may be of the coherent type or of the direct or incoherent type depending on the case. These devices rely on the presence of particles in the medium in which the optical measurements are carried out, and they are very difficult to tune.

For helicopters, a propeller rotating above the rotor has been developed. This propeller is fixed on the top of a tube integrally connected to the main gearbox of the helicopter. The propeller, fitted with a Venturi tube at each end, rotates at approximately 720 rpm above the main rotor hub. The velocity of the airflow is determined by the position in amplitude and phase of the pressure variation between each venturi relative to the angular position. The system in question is very cumbersome to install on a helicopter and is not widely used. It has the same defects as the Pitot tube at low airspeeds.

Again for helicopters, a synthetic anemometry concept has been developed which makes it possible to provide more reliable velocity information of the airflow at low airspeeds. This concept is based on the principle that the velocity of the air is proportional to the difference between the cyclic pitch of the rotor lifting the helicopter and the attitude of the helicopter. This principle makes it possible to determine both the direction and the modulus of the velocity vector of the air. This method has only been used to date in flight test centres in order to develop new helicopters. This method has not been employed in normal use of helicopters, essentially because of its high development cost and calibration difficulties.

SUMMARY OF THE INVENTION

It is a subject of the invention to overcome some or all of the problems mentioned above by providing an inexpensive aerodynamic measurement probe for carrying out reliable measurements even at low speeds.

It is therefore a subject of the present invention to provide a probe for aerodynamic measurement of an airflow, comprising a plate rotating about an axis, a transmitter for transmitting a sound wave and a receiver responsive to the sound wave, the transmitter and the receiver forming two elements which are integrally connected to the plate and are placed at separate positions on the plate, the probe furthermore comprising means for delivering information representing a time of flight of the sound wave between the two elements and a temporal variation of the information.

Employing the rotating plate makes the probe particularly suitable for use on a helicopter, in which the rotating plate can be fixed at the centre of the rotor lifting the helicopter. At this position, the movements of the rotor do not interfere greatly with the airflow.

It is a further subject of the present invention to provide a helicopter, comprising a probe according to the invention and means for displaying a velocity of the airflow, as determined by means of the probe, and a local incidence of the airflow as determined by means of the probe.

BRIEF DESCRIPTION OF THE DRAWINGS

The invention will be understood more clearly, and other advantages will become apparent, on reading the detailed description of an embodiment given by way of example, the description being illustrated by the appended drawing in which.

For the sake of clarity, elements which are the same will be provided with the same references in the various figures.

DETAILED DESCRIPTION OF THE PREFERRED EMBODIMENT

The invention will be described with reference to the use of a probe fitted to a helicopter. It is of course possible to use such a probe for any aerodynamic measurement of an airflow, on board an aircraft, in a wind tunnel, etc.

Figure 1:
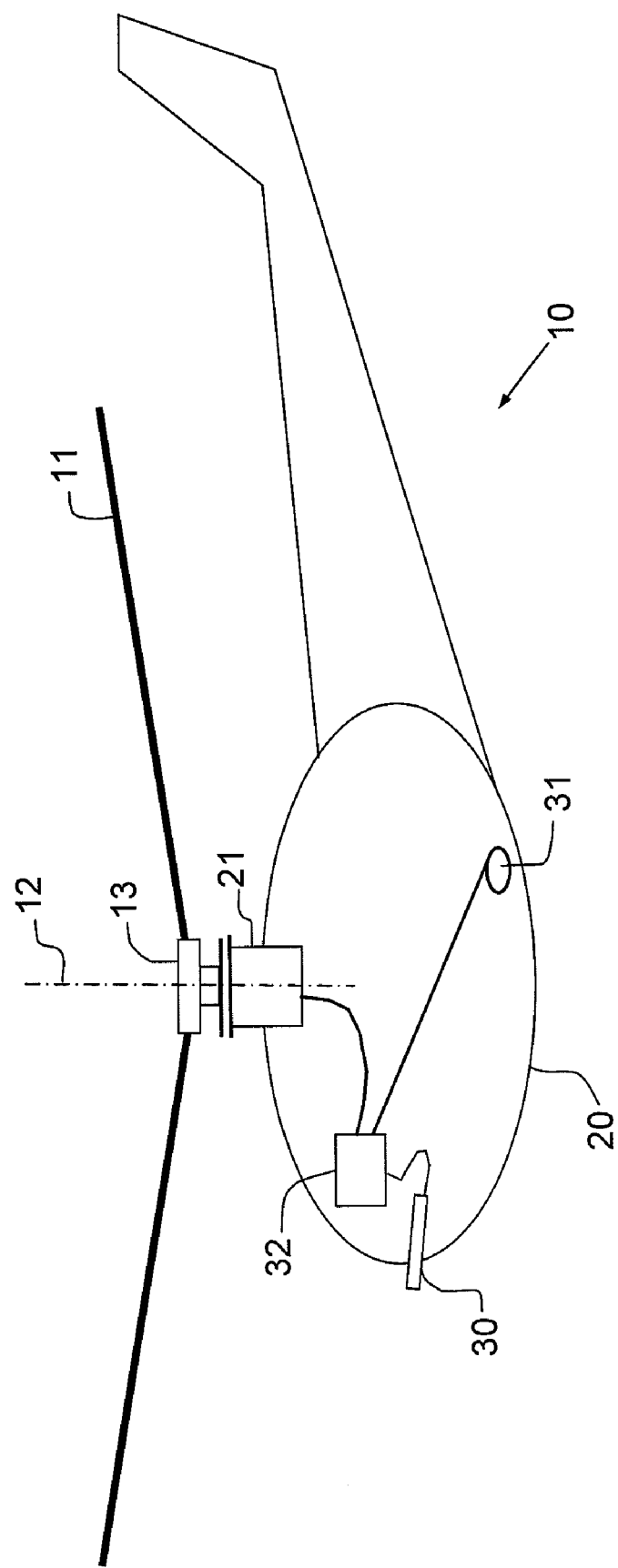
FIG. 1 schematically represents an example of the installation of the various means of the invention in a helicopter.

FIG. 1 represents a helicopter 10 comprising a lift rotor 11 rotating about an axis 12. A plate 13 rotating with the rotor 11 is arranged at the centre of the rotor 11.

Figure 2:
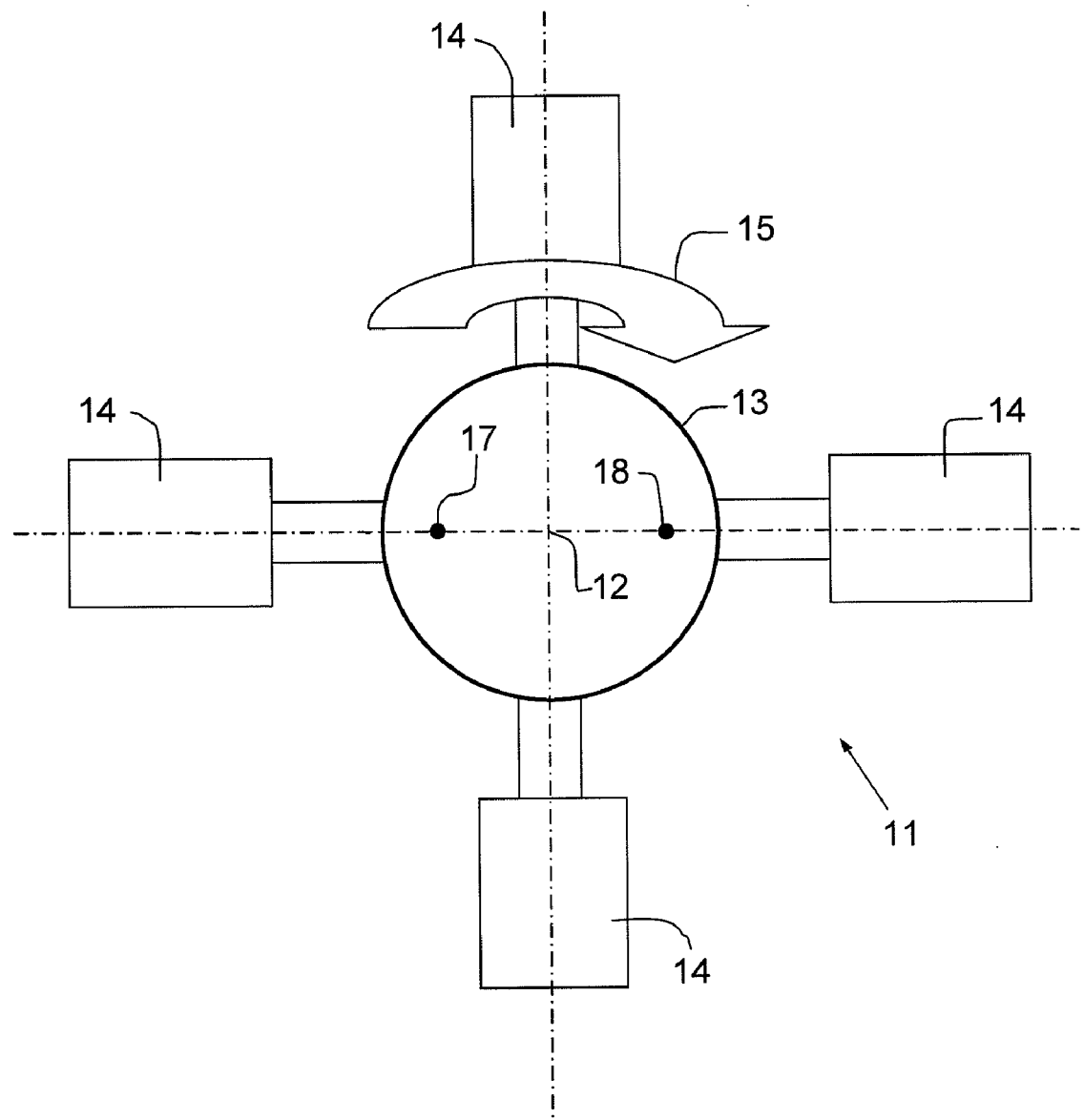
FIG. 2 represents an example of the position of a sonic transmitter and receiver which are used in the invention.

FIG. 2 represents a plan view of the rotating plate 13 as well as four blades 14 of the rotor 11. The plate 13 is circular, and its centre lies on the axis 12. The plate 13 is integrally connected to the rotor 11 and rotates with it. The rotation of the rotor about the axis 12 is symbolized by the arrow 15. In a helicopter, the rotation speed of the rotor is of the order of a few revolutions per second. It is also possible to make the plate 13 rotate at a rotation speed other than that of the rotor 11, by driving it with a motor separate from the turbine which generally drives the rotor 11, or by providing a speed multiplier with gears between the turbine and the plate 13. Such a plate 13 may of course be installed at a position other than that represented in FIG. 1.

The aerodynamic measurement probe comprises a transmitter 17 for transmitting a sound wave, and a receiver 18 responsive to the sound wave coming from the transmitter 17. For example, the transmission of an ultrasound wave whose frequency is of the order of 40 kHz may be selected. The transmitter 17 and the receiver 18 are placed at separate positions on the plate 13. Advantageously, an attempt will be made to place the transmitter 17 and the receiver 18 as far as possible from one another in order to increase the distance between them. It is therefore possible to arrange them diametrically opposite on the plate 13.

Figure 3:
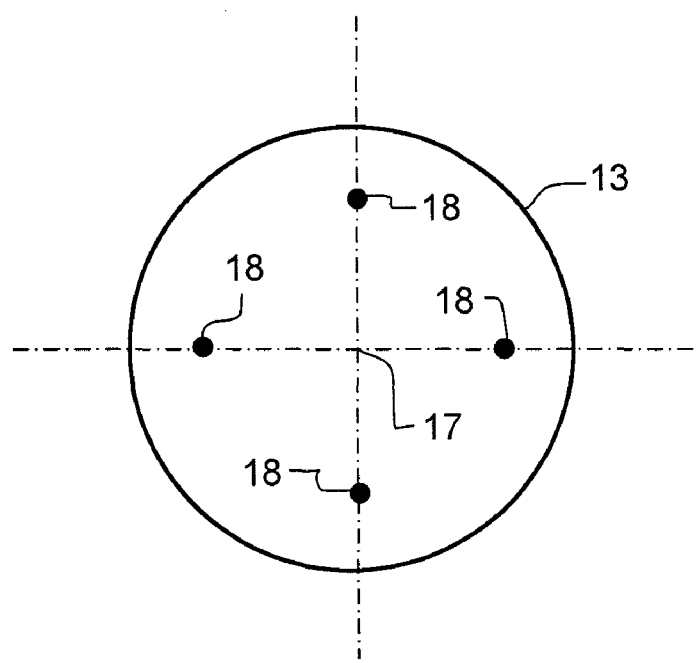
FIG. 3 represents an alternative arrangement of the elements formed by the transmitter and the receiver, in which one of the elements has been duplicated.

FIG. 3 represents an alternative arrangement of the elements formed by the transmitter 17 and the receiver 18, in which one of the elements has been duplicated. In this variant, a transmitter 17 is placed at the centre of the plate 13 and a plurality of receivers 18, four in the example represented, are placed around the transmitter 17. The receivers are angularly distributed around the transmitter 17 and are equidistant from the transmitter 17.

The probe comprises means for generating a sound wave, which is transmitted by the transmitter 17, means for the receiver or receivers 18 to register the sound wave transmitted by the transmitter 17, and means for delivering information representing a time of flight of the sound wave between the two elements 17 and 18 and a temporal variation of the information. These various means may be placed inside a body 20 of the helicopter 10 and connected to the plate 13 by means of a rotating contactor 21. Redundancy of one of these elements, as represented in FIG. 3, makes it possible to obtain a variety of separate data. A malfunction of one of the elements 17 or 18 can be detected. The information, or the aerodynamic parameters determined on the basis of the information, i.e. velocity and incidence of the airflow, may also be averaged in order to improve the precision of the probe.

There are various suitable possibilities for obtaining the information representing the time of flight of the sound wave between the transmitter 17 and each of the receivers 18. The receivers 18 may be microphones responsive to the waves transmitted by the transmitter 17, or resonant receivers, i.e. responsive to a particular frequency.

The means for delivering information representing a time of flight of the sound wave may detect the amplitude of the received sound wave. Even if the signal transmitted by the transmitter 17 has a steep edge when it is generated, the wave received by each of the receivers 18 may increase more slowly without exhibiting a rising edge. The means for delivering information representing a time of flight of the sound wave may then comprise means for forming an envelope signal of the received signal and means for generating a binary signal, a leading edge of which occurs when the envelope signal exceeds a first threshold and a trailing edge of which occurs when the envelope signal falls below a second threshold, the first threshold being higher than the second threshold. The means for generating the binary signal may comprise a Schmitt trigger.

As an alternative, the means for delivering information representing a time of flight of the sound wave may detect a phase shift between the transmitted signal and the received signal. In order to avoid the problem of ambiguity induced by high frequencies, the transmitted sound wave may be modulated around a given frequency. An example of such modulation is known in the literature by the name "chirp". This may for example be a sinusoidal signal whose frequency varies linearly with time around a central frequency. The device will then comprise means for decoding a frequency modulation of the signal received by the receiver 18.

Figure 4:
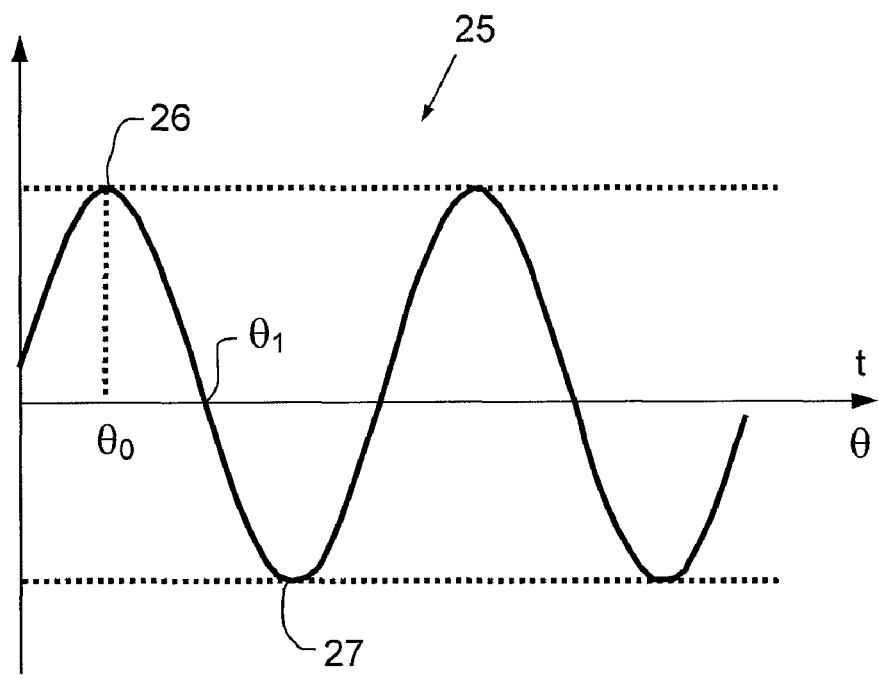
FIG. 4 represents an example of a curve showing the variation of information obtained from the sonic receiver.

FIG. 4 represents the variation over time of the signal collected by one of the receivers 18. It is assumed that the velocity and the direction of the airflow do not vary during the rotation of the plate 13, at least over several revolutions of the plate 13. The time is represented on the abscissa and the amplitude of the signal on the ordinate. It is not necessary for the signal to be directly proportional to the time of flight of the sound wave between the transmitter and receiver in question. It is sufficient for the signal to represent the time of flight. In other words, it is sufficient that a one-to-one relationship between the signal and the time of flight exists.

When the plate rotates at a constant speed, which is the case for the rotor of a helicopter, the abscissa in FIG. 4 also represents the angular position 8 of a point on the plate 13 rotating about the axis 12, here the position of the receiver 18 in question. The probe comprises means for measuring a temporal variation of an angular position θ of the plate 13 about its axis 12. The angular position θ may be acquired directly from the rotor 11, for example by means of an angle encoder. The curve representing the variation in the signal follows a sinusoid 25, a maximum 26 and a minimum 27 of which are obtained when an axis passing through the transmitter 17 and through the receiver 18 has an orientation which is the same as that of the velocity vector of the airflow. The receiver 18 is upstream of the transmitter 17 for the maximum 26, and the receiver 18 is downstream of the transmitter 17 for the minimum 27. The amplitude of the sinusoid 25 is directly correlated with the modulus of the velocity vector of the airflow. In particular, the amplitude of the sinusoid 25 is zero, or in other words the curve represented by FIG. 4 is a horizontal line, when the helicopter 10 is performing stationary flight relative to the air around it. More generally, the probe comprises means for determining the local velocity of the airflow in the vicinity of the plate 13, as a function of the difference between the maximum value 26 and the minimum value 27 of the temporal variation of the information.

Merely knowing the values of the maximum 26 and the minimum 27, without knowing the angular position of the plate 13 for the minimum 26 and the maximum 27, already makes it possible to determine the modulus of the local velocity vector of the airflow. This determination is carried out without being obliged to align the transmitter 17 and one of the receivers 18 with the axis of the airflow, as may be the case for a static probe.

The angular position $\theta_0$ of the plate 13 at the time of the maximum 26 or the minimum 27 gives the local incidence of the airflow relative to the plate 13. It may be easier to determine an angular position $\theta_1$ of the plate 13 when the value of the signal is equal to half the amplitude of the sinusoid 25. The local incidence will then be phase-shifted by 90° relative to this angular position $\theta_1$.

In order to obtain values of velocity and incidence of the airflow, it may be expedient to carry out calibration of the probe. More precisely, the one-to-one relationship between the value of the amplitude of the signal and the velocity of the airflow is established for the velocity, and a possible phase shift of the angle $\theta_0$ or $\theta_1$ is determined relative to the real incidence of the airflow.

It should be borne in mind that the experimental measurement of the time of flight between a transmitter and a receiver turns out to be greater than that provided by theory, to within a relatively constant value. Time of flight measurement methods consequently require calibration of the receivers, each having its own characteristics of response time, passband etc. This calibration of the receivers will depend on environmental conditions, and in particular temperature and pressure.

The applicant has discovered that the error in measuring the time of flight between a transmitter and a receiver is due mainly to the receiver rather than the transmitter. By using only one receiver and a plurality of transmitters, the error in the measurement remains constant and only one calibration is then necessary. In the particular case of the alternative embodiment represented in FIG. 3, it is possible to place a receiver 18 at the centre of the plate 13 and a plurality of transmitters 17 distributed around the receiver 18.

The helicopter 1 may also have sensor means 30 for the total pressure Pt, comprising for example a Pitot tube, and sensor means 31 for the static pressure Ps of the airflow around the helicopter 10. The pressure sensor means 30 and 31 will be connected to an instrument 32 installed on the instrument panel of the helicopter 10. The instrument 32 processes the pressure information obtained from the pressure sensor means 30 and 31, in order to determine again the modulus of the velocity vector of the airflow around the helicopter 10.

The Pitot tube is substantially oriented along a longitudinal axis of the helicopter 10 in order to determine the value of the velocity along this axis. The longitudinal axis of the helicopter 10 is contained in the plane of FIG. 1. It would of course be possible to place a second Pitot tube along a transverse axis of the helicopter 1, this axis being perpendicular to the plane of FIG. 1, in order to measure the second velocity along the transverse axis. This measure, however, is of only minor interest because the airspeed of the helicopter along a transverse axis is often small.

The values of the moduli of the velocity vector of the airflow, as determined by the information representing a time of flight of the sound wave and by the measurements of total pressure Pt and static pressure Ps, may be different; in what follows, the velocity determined by the information representing a time of flight of the sound wave will be denoted Vs and the second velocity, i.e. that determined on the basis of the air pressure measurements, will be denoted Vp.

The instrument 32 comprises a computer for determining the first velocity Vs with the aid of the measurements of the time of flight of the sound wave between the transmitter 17 and the receiver or receivers 18.

The computer also determines the second velocity by using the following equation:

$$Pt - Ps = \rho \frac{Vp^2}{2}$$

where $\rho$ represents the density of the air at ground level.

The instrument 32 may also give the pilot of the helicopter 10 information regarding the altitude and the attitude of the helicopter 10.

The instrument 32 may furthermore comprise means for determining a third velocity Va on the basis of weighting the first velocity Vs and the second velocity Vp. Advantageously, the means for determining the third velocity Va also employ the computer of the instrument 32 already used for calculating the first and second velocities Vs and Vp, and optionally the altitude and attitude of the helicopter 10.

Advantageously, the weighting is not carried out over all the airspeeds which the helicopter 10 can reach. The first velocity Vs will be favoured at low airspeeds, and the second velocity Vp will be favoured at high airspeeds. More precisely, the third velocity Va is equal to the second velocity Vp when the second velocity Vp is less than a first velocity value V1. The third velocity Va is equal to the first velocity Vs when the first velocity Vs is higher than a second velocity value V2, V1 being lower than V2. It is only between the two values V1 and V2 that the weighting is effective. Between V1 and V2, for example:

$$Va = \alpha \cdot Vs + (1-\alpha) \cdot Vp$$

where $\alpha$ represents a weighting coefficient varying between 0 and 1. In order to avoid jumps in the value of Va, $\alpha$ will be given a value equal to 1 when Vs=V1 and a value of zero when Vp=V2. From V1 to V2, $\alpha$ will be varied continuously between 1 and 0. For example, V1 may be given a value of 30 knots and V2 may be given a value of 50 knots. It will be recalled that one knot is equal to 0.51 m/s.

The instrument 32 may comprise means for displaying the velocity Va of the airflow and its local incidence in the vicinity of the plate 13.

It will be readily seen by one of ordinary skill in the art that embodiments according to the present invention fulfill many of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A probe for aerodynamic measurement of an airflow, comprising:
   a plate rotating about an axis, a transmitter for transmitting a sound wave and a receiver responsive to the sound wave, the transmitter and the receiver forming two elements which are integrally connected to the plate and are placed at separate positions on the plate,
   the probe further comprising means for delivering information representing a time of flight of the sound wave between the two elements and a temporal variation of the information, and comprising means for determining the local velocity of the airflow in the vicinity of the plate as a function of the difference between a maximum value and a minimum value of the temporal variation of the information.

2. The probe according to claim 1, further comprising means for measuring a temporal variation of an angular position of the plate about its axis and means for determining the local incidence of the airflow relative to the plate as a function of angular positions of the plate at the time of the maximum and minimum values of the temporal variation of the information.

3. The probe according to claim 1, further comprising a plurality of second elements angularly distributed around the first element.

4. The probe according to claim 3, wherein the second elements are equidistant from the first element.

5. The probe according to claim 1, wherein the first element is a receiver, and wherein the second element is a transmitter.

6. The probe according to claim 1, wherein said probe is fitted to a helicopter comprising a tilt rotor which provides the helicopter with lift, and wherein the rotating plate is integrally connected to the rotor.

7. The probe according to claim 1, further comprising pressure sensors for the air around the helicopter, means for determining a second velocity of the airflow around the helicopter on the basis of information received from the pressure sensors and means for determining a third velocity of the airflow on the basis of weighting a first velocity of the airflow, obtained from the information representing a time of flight of the sound wave, and the second velocity.

8. A helicopter, comprising a probe according to claim 1 and means for displaying a velocity of the airflow, as determined by means of the probe.

9. A helicopter according to claim 8, further comprising means for displaying a local incidence of the airflow, as determined by means of the probe.

* * * * *